(12) United States Patent
Ji et al.

(10) Patent No.: US 8,922,931 B1
(45) Date of Patent: Dec. 30, 2014

(54) DISK DRIVE RELEASING VARIABLE AMOUNT OF BUFFERED WRITE DATA BASED ON SLIDING WINDOW OF PREDICTED SERVO QUALITY

(71) Applicant: Western Digital Technologies, Inc., Irvine, CA (US)

(72) Inventors: Chuanwen Ji, Irvine, CA (US); Alain Chahwan, Irvine, CA (US); Orhan Beker, Dove Canyon, CA (US); Yanan Huang, Torrance, CA (US); Duc T. Phan, Saratoga, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 13/928,329

(22) Filed: Jun. 26, 2013

Related U.S. Application Data (60) Provisional application No. 61/822,485, filed on May 13, 2013.

(51) Int. Cl.
*G11B 19/04* (2006.01)
*G11B 5/596* (2006.01)

(52) U.S. Cl.
CPC ............ *G11B 19/044* (2013.01); *G11B 19/042* (2013.01); *G11B 19/045* (2013.01); *G11B 5/59694* (2013.01); *G11B 19/041* (2013.01)
USPC .......................................... 360/60; 360/77.08

(58) Field of Classification Search
None
See application file for complete search history.

(56) References Cited

U.S. PATENT DOCUMENTS

| | | | |
|---|---|---|---|
| 5,126,895 A | 6/1992 | Yasuda et al. | |
| 5,392,290 A | 2/1995 | Brown et al. | |
| 5,570,244 A | 10/1996 | Wiselogel | |
| 5,831,781 A * | 11/1998 | Okamura | 360/31 |
| 5,909,334 A | 6/1999 | Barr et al. | |
| 6,014,283 A | 1/2000 | Codilian et al. | |
| 6,052,076 A | 4/2000 | Patton, III et al. | |
| 6,052,250 A | 4/2000 | Golowka et al. | |
| 6,067,206 A | 5/2000 | Hull et al. | |
| 6,078,453 A | 6/2000 | Dziallo et al. | |
| 6,091,564 A | 7/2000 | Codilian et al. | |
| 6,094,020 A | 7/2000 | Goretzki et al. | |
| 6,101,065 A | 8/2000 | Alfred et al. | |
| 6,104,153 A | 8/2000 | Codilian et al. | |
| 6,122,133 A | 9/2000 | Nazarian et al. | |
| 6,122,135 A | 9/2000 | Stich | |
| 6,134,610 A | 10/2000 | Chung | |
| 6,141,175 A | 10/2000 | Nazarian et al. | |
| 6,160,368 A | 12/2000 | Plutowski | |
| 6,181,502 B1 | 1/2001 | Hussein et al. | |

(Continued)

*Primary Examiner* — Wayne Young
*Assistant Examiner* — James L Habermehl (57) ABSTRACT

A disk drive is disclosed wherein N data wedges of write data are buffered in a buffer. After writing at least two of the data wedges to the disk including a first data wedge and a second data wedge, a first servo metric value is measured when reading a first servo sector, and a second servo metric value is predicted based on the first servo metric value, wherein the second servo metric value corresponds to a second servo sector following the first servo sector. When the first servo metric value indicates a safe write condition and the second servo metric value indicates an unsafe write condition, the first data wedge is released from the buffer, and when the first servo metric value indicates a safe write condition and the second servo metric value indicates a safe write condition, the first and second data wedges are released from the buffer.

24 Claims, 8 Drawing Sheets

(56) References Cited

U.S. PATENT DOCUMENTS

| | | |
|---|---|---|
| 6,195,222 B1 | 2/2001 | Heminger et al. |
| 6,198,584 B1 | 3/2001 | Codilian et al. |
| 6,198,590 B1 | 3/2001 | Codilian et al. |
| 6,204,988 B1 | 3/2001 | Codilian et al. |
| 6,243,223 B1 | 6/2001 | Elliott et al. |
| 6,281,652 B1 | 8/2001 | Ryan et al. |
| 6,285,521 B1 | 9/2001 | Hussein |
| 6,292,320 B1 | 9/2001 | Mason et al. |
| 6,310,742 B1 | 10/2001 | Nazarian et al. |
| 6,320,718 B1 | 11/2001 | Bouwkamp et al. |
| 6,342,984 B1 | 1/2002 | Hussein et al. |
| 6,347,018 B1 | 2/2002 | Kadlec et al. |
| 6,369,972 B1 | 4/2002 | Codilian et al. |
| 6,369,974 B1 | 4/2002 | Asgari et al. |
| 6,429,990 B2 | 8/2002 | Serrano et al. |
| 6,462,896 B1 | 10/2002 | Codilian et al. |
| 6,476,996 B1 | 11/2002 | Ryan |
| 6,484,577 B1 | 11/2002 | Bennett |
| 6,493,169 B1 | 12/2002 | Ferris et al. |
| 6,496,315 B1 | 12/2002 | Ueda et al. |
| 6,496,324 B1 | 12/2002 | Golowka et al. |
| 6,498,698 B1 | 12/2002 | Golowka et al. |
| 6,507,450 B1 | 1/2003 | Elliott |
| 6,534,936 B2 | 3/2003 | Messenger et al. |
| 6,538,839 B1 | 3/2003 | Ryan |
| 6,545,835 B1 | 4/2003 | Codilian et al. |
| 6,549,359 B1 | 4/2003 | Bennett et al. |
| 6,549,361 B1 | 4/2003 | Bennett et al. |
| 6,560,056 B1 | 5/2003 | Ryan |
| 6,568,268 B1 | 5/2003 | Bennett |
| 6,574,062 B1 | 6/2003 | Bennett et al. |
| 6,577,465 B1 | 6/2003 | Bennett et al. |
| 6,614,615 B1 | 9/2003 | Ju et al. |
| 6,614,618 B1 | 9/2003 | Sheh et al. |
| 6,621,652 B2 * | 9/2003 | Haines et al. .................. 360/53 |
| 6,636,377 B1 | 10/2003 | Yu et al. |
| 6,690,536 B1 | 2/2004 | Ryan |
| 6,693,764 B1 | 2/2004 | Sheh et al. |
| 6,707,635 B1 | 3/2004 | Codilian et al. |
| 6,710,953 B1 | 3/2004 | Vallis et al. |
| 6,710,966 B1 | 3/2004 | Codilian et al. |
| 6,714,371 B1 | 3/2004 | Codilian |
| 6,714,372 B1 | 3/2004 | Codilian et al. |
| 6,724,564 B1 | 4/2004 | Codilian et al. |
| 6,731,450 B1 | 5/2004 | Codilian et al. |
| 6,735,041 B1 | 5/2004 | Codilian et al. |
| 6,738,220 B1 | 5/2004 | Codilian |
| 6,747,837 B1 | 6/2004 | Bennett |
| 6,760,186 B1 | 7/2004 | Codilian et al. |
| 6,788,483 B1 | 9/2004 | Ferris et al. |
| 6,791,785 B1 | 9/2004 | Messenger et al. |
| 6,795,268 B1 | 9/2004 | Ryan |
| 6,819,518 B1 | 11/2004 | Melkote et al. |
| 6,826,006 B1 | 11/2004 | Melkote et al. |
| 6,826,007 B1 | 11/2004 | Patton, III |
| 6,847,502 B1 | 1/2005 | Codilian |
| 6,850,383 B1 | 2/2005 | Bennett |
| 6,850,384 B1 | 2/2005 | Bennett |
| 6,867,944 B1 | 3/2005 | Ryan |
| 6,876,508 B1 | 4/2005 | Patton, III et al. |
| 6,882,496 B1 | 4/2005 | Codilian et al. |
| 6,885,514 B1 | 4/2005 | Codilian et al. |
| 6,900,958 B1 | 5/2005 | Yi et al. |
| 6,900,959 B1 | 5/2005 | Gardner et al. |
| 6,903,897 B1 | 6/2005 | Wang et al. |
| 6,914,740 B1 | 7/2005 | Tu et al. |
| 6,914,743 B1 | 7/2005 | Narayana et al. |
| 6,920,004 B1 | 7/2005 | Codilian et al. |
| 6,924,959 B1 | 8/2005 | Melkote et al. |
| 6,924,960 B1 | 8/2005 | Melkote et al. |
| 6,924,961 B1 | 8/2005 | Melkote et al. |
| 6,934,114 B1 | 8/2005 | Codilian et al. |
| 6,934,135 B1 | 8/2005 | Ryan |
| 6,937,420 B1 | 8/2005 | McNab et al. |
| 6,937,423 B1 | 8/2005 | Ngo et al. |
| 6,952,322 B1 | 10/2005 | Codilian et al. |
| 6,954,324 B1 | 10/2005 | Tu et al. |
| 6,958,881 B1 | 10/2005 | Codilian et al. |
| 6,963,465 B1 | 11/2005 | Melkote et al. |
| 6,965,488 B1 | 11/2005 | Bennett |
| 6,967,458 B1 | 11/2005 | Bennett et al. |
| 6,967,811 B1 | 11/2005 | Codilian et al. |
| 6,970,319 B1 | 11/2005 | Bennett et al. |
| 6,972,539 B1 | 12/2005 | Codilian et al. |
| 6,972,540 B1 | 12/2005 | Wang et al. |
| 6,972,922 B1 | 12/2005 | Subrahmanyam et al. |
| 6,975,480 B1 | 12/2005 | Codilian et al. |
| 6,977,789 B1 | 12/2005 | Cloke |
| 6,980,389 B1 | 12/2005 | Kupferman |
| 6,987,636 B1 | 1/2006 | Chue et al. |
| 6,987,639 B1 | 1/2006 | Yu |
| 6,989,954 B1 | 1/2006 | Lee et al. |
| 6,992,848 B1 | 1/2006 | Agarwal et al. |
| 6,992,851 B1 | 1/2006 | Cloke |
| 6,992,852 B1 | 1/2006 | Ying et al. |
| 6,995,941 B1 | 2/2006 | Miyamura et al. |
| 6,999,263 B1 | 2/2006 | Melkote et al. |
| 6,999,267 B1 | 2/2006 | Melkote et al. |
| 7,006,320 B1 | 2/2006 | Bennett et al. |
| 7,016,134 B1 | 3/2006 | Agarwal et al. |
| 7,023,637 B1 | 4/2006 | Kupferman |
| 7,023,640 B1 | 4/2006 | Codilian et al. |
| 7,027,256 B1 | 4/2006 | Subrahmanyam et al. |
| 7,027,257 B1 | 4/2006 | Kupferman |
| 7,035,026 B2 | 4/2006 | Codilian et al. |
| 7,046,472 B1 | 5/2006 | Melkote et al. |
| 7,050,249 B1 | 5/2006 | Chue et al. |
| 7,050,254 B1 | 5/2006 | Yu et al. |
| 7,050,258 B1 | 5/2006 | Codilian |
| 7,054,098 B1 | 5/2006 | Yu et al. |
| 7,061,714 B1 | 6/2006 | Yu |
| 7,064,918 B1 | 6/2006 | Codilian et al. |
| 7,068,451 B1 | 6/2006 | Wang et al. |
| 7,068,459 B1 | 6/2006 | Cloke et al. |
| 7,068,461 B1 | 6/2006 | Chue et al. |
| 7,068,463 B1 | 6/2006 | Ji et al. |
| 7,088,547 B1 | 8/2006 | Wang et al. |
| 7,095,579 B1 | 8/2006 | Ryan et al. |
| 7,110,208 B1 | 9/2006 | Miyamura et al. |
| 7,110,214 B1 | 9/2006 | Tu et al. |
| 7,113,362 B1 | 9/2006 | Lee et al. |
| 7,113,365 B1 | 9/2006 | Ryan et al. |
| 7,116,505 B1 | 10/2006 | Kupferman |
| 7,126,781 B1 | 10/2006 | Bennett |
| 7,158,329 B1 | 1/2007 | Ryan |
| 7,180,703 B1 | 2/2007 | Subrahmanyam et al. |
| 7,184,230 B1 | 2/2007 | Chue et al. |
| 7,196,864 B1 | 3/2007 | Yi et al. |
| 7,199,966 B1 | 4/2007 | Tu et al. |
| 7,203,021 B1 | 4/2007 | Ryan et al. |
| 7,209,321 B1 | 4/2007 | Bennett |
| 7,212,364 B1 | 5/2007 | Lee |
| 7,212,374 B1 | 5/2007 | Wang et al |
| 7,215,504 B1 | 5/2007 | Bennett |
| 7,224,543 B1 | 5/2007 | Abrishamchian et al. |
| 7,224,546 B1 | 5/2007 | Orakcilar et al. |
| 7,245,447 B2 * | 7/2007 | Zaitsu ............................ 360/60 |
| 7,248,426 B1 | 7/2007 | Weerasooriya et al. |
| 7,251,098 B1 | 7/2007 | Wang et al. |
| 7,253,582 B1 | 8/2007 | Ding et al. |
| 7,253,989 B1 | 8/2007 | Lau et al. |
| 7,265,933 B1 | 9/2007 | Phan et al. |
| 7,289,288 B1 | 10/2007 | Tu |
| 7,298,574 B1 | 11/2007 | Melkote et al. |
| 7,301,717 B1 | 11/2007 | Lee et al. |
| 7,304,819 B1 | 12/2007 | Melkote et al. |
| 7,330,019 B1 | 2/2008 | Bennett |
| 7,330,327 B1 | 2/2008 | Chue et al. |
| 7,333,280 B1 | 2/2008 | Lifchits et al. |
| 7,333,290 B1 | 2/2008 | Kupferman |
| 7,339,761 B1 | 3/2008 | Tu et al. |
| 7,365,932 B1 | 4/2008 | Bennett |
| 7,388,728 B1 | 6/2008 | Chen et al. |
| 7,391,583 B1 | 6/2008 | Sheh et al. |

(56) References Cited

U.S. PATENT DOCUMENTS

| | | |
|---|---|---|
| 7,391,584 B1 | 6/2008 | Sheh et al. |
| 7,433,143 B1 | 10/2008 | Ying et al. |
| 7,440,210 B1 | 10/2008 | Lee |
| 7,440,225 B1 | 10/2008 | Chen et al. |
| 7,450,334 B1 | 11/2008 | Wang et al. |
| 7,450,336 B1 | 11/2008 | Wang et al. |
| 7,453,661 B1 | 11/2008 | Jang et al. |
| 7,457,071 B1 | 11/2008 | Sheh |
| 7,466,509 B1 | 12/2008 | Chen et al. |
| 7,468,855 B1 | 12/2008 | Weerasooriya et al. |
| 7,477,471 B1 | 1/2009 | Nemshick et al. |
| 7,480,116 B1 | 1/2009 | Bennett |
| 7,489,464 B1 | 2/2009 | McNab et al. |
| 7,492,546 B1 | 2/2009 | Miyamura |
| 7,495,857 B1 | 2/2009 | Bennett |
| 7,499,236 B1 | 3/2009 | Lee et al. |
| 7,502,192 B1 | 3/2009 | Wang et al. |
| 7,502,195 B1 | 3/2009 | Wu et al. |
| 7,502,197 B1 | 3/2009 | Chue |
| 7,505,223 B1 | 3/2009 | McCornack |
| 7,508,616 B2 * | 3/2009 | Fitzpatrick et al. .............. 360/31 |
| 7,542,225 B1 | 6/2009 | Ding et al. |
| 7,545,593 B1 | 6/2009 | Sun et al. |
| 7,548,392 B1 | 6/2009 | Desai et al. |
| 7,551,390 B1 | 6/2009 | Wang et al. |
| 7,558,016 B1 | 7/2009 | Le et al. |
| 7,573,670 B1 | 8/2009 | Ryan et al. |
| 7,576,941 B1 | 8/2009 | Chen et al. |
| 7,580,212 B1 | 8/2009 | Li et al. |
| 7,583,470 B1 | 9/2009 | Chen et al. |
| 7,595,954 B1 | 9/2009 | Chen et al. |
| 7,602,575 B1 | 10/2009 | Lifchits et al. |
| 7,616,399 B1 | 11/2009 | Chen et al. |
| 7,619,844 B1 | 11/2009 | Bennett |
| 7,626,782 B1 | 12/2009 | Yu et al. |
| 7,630,162 B2 | 12/2009 | Zhao et al. |
| 7,639,447 B1 | 12/2009 | Yu et al. |
| 7,656,604 B1 | 2/2010 | Liang et al. |
| 7,656,607 B1 | 2/2010 | Bennett |
| 7,660,067 B1 | 2/2010 | Ji et al. |
| 7,663,835 B1 | 2/2010 | Yu et al. |
| 7,675,707 B1 | 3/2010 | Liu et al. |
| 7,679,854 B1 | 3/2010 | Narayana et al. |
| 7,688,534 B1 | 3/2010 | McCornack |
| 7,688,538 B1 | 3/2010 | Chen et al. |
| 7,688,539 B1 | 3/2010 | Bryant et al. |
| 7,697,233 B1 | 4/2010 | Bennett et al. |
| 7,701,661 B1 | 4/2010 | Bennett |
| 7,710,676 B1 | 5/2010 | Chue |
| 7,715,138 B1 | 5/2010 | Kupferman |
| 7,729,079 B1 | 6/2010 | Huber |
| 7,733,189 B1 | 6/2010 | Bennett |
| 7,746,592 B1 | 6/2010 | Liang et al. |
| 7,746,594 B1 | 6/2010 | Guo et al. |
| 7,746,595 B1 | 6/2010 | Guo et al. |
| 7,760,461 B1 | 7/2010 | Bennett |
| 7,800,853 B1 | 9/2010 | Guo et al. |
| 7,800,856 B1 | 9/2010 | Bennett et al. |
| 7,800,857 B1 | 9/2010 | Calaway et al. |
| 7,839,591 B1 | 11/2010 | Weerasooriya et al. |
| 7,839,595 B1 | 11/2010 | Chue et al. |
| 7,839,600 B1 | 11/2010 | Babinski et al. |
| 7,843,662 B1 | 11/2010 | Weerasooriya et al. |
| 7,852,588 B1 | 12/2010 | Ferris et al. |
| 7,852,592 B1 | 12/2010 | Liang et al. |
| 7,859,784 B2 * | 12/2010 | Ogawa ............................ 360/53 |
| 7,864,481 B1 | 1/2011 | Kon et al. |
| 7,864,482 B1 | 1/2011 | Babinski et al. |
| 7,869,155 B1 | 1/2011 | Wong |
| 7,876,522 B1 | 1/2011 | Calaway et al. |
| 7,876,523 B1 | 1/2011 | Panyavoravaj et al. |
| 7,916,415 B1 | 3/2011 | Chue |
| 7,916,416 B1 | 3/2011 | Guo et al. |
| 7,916,420 B1 | 3/2011 | McFadyen et al. |
| 7,916,421 B1 * | 3/2011 | Liikanen et al. ........... 360/77.01 |
| 7,916,422 B1 | 3/2011 | Guo et al. |
| 7,929,238 B1 | 4/2011 | Vasquez |
| 7,961,422 B1 | 6/2011 | Chen et al. |
| 8,000,053 B1 | 8/2011 | Anderson |
| 8,031,423 B1 | 10/2011 | Tsai et al. |
| 8,054,022 B1 | 11/2011 | Ryan et al. |
| 8,059,357 B1 | 11/2011 | Knigge et al. |
| 8,059,360 B1 | 11/2011 | Melkote et al. |
| 8,072,703 B1 | 12/2011 | Calaway et al. |
| 8,077,428 B1 | 12/2011 | Chen et al. |
| 8,078,901 B1 | 12/2011 | Meyer et al. |
| 8,081,395 B1 | 12/2011 | Ferris |
| 8,085,020 B1 | 12/2011 | Bennett |
| 8,116,023 B1 | 2/2012 | Kupferman |
| 8,145,934 B1 | 3/2012 | Ferris et al. |
| 8,179,626 B1 | 5/2012 | Ryan et al. |
| 8,189,286 B1 | 5/2012 | Chen et al. |
| 8,213,106 B1 | 7/2012 | Guo et al. |
| 8,254,222 B1 | 8/2012 | Tang |
| 8,300,348 B1 | 10/2012 | Liu et al. |
| 8,315,005 B1 | 11/2012 | Zou et al. |
| 8,315,006 B1 | 11/2012 | Chahwan et al. |
| 8,320,069 B1 | 11/2012 | Knigge et al. |
| 8,351,174 B1 | 1/2013 | Gardner et al. |
| 8,358,114 B1 | 1/2013 | Ferris et al. |
| 8,358,145 B1 | 1/2013 | Ferris et al. |
| 8,390,367 B1 | 3/2013 | Bennett |
| 8,432,031 B1 | 4/2013 | Agness et al. |
| 8,432,629 B1 | 4/2013 | Rigney et al. |
| 8,451,697 B1 | 5/2013 | Rigney et al. |
| 8,482,873 B1 | 7/2013 | Chue et al. |
| 8,498,076 B1 | 7/2013 | Sheh et al. |
| 8,498,172 B1 | 7/2013 | Patton, III et al. |
| 8,508,881 B1 | 8/2013 | Babinski et al. |
| 8,531,798 B1 | 9/2013 | Xi et al. |
| 8,537,486 B2 | 9/2013 | Liang et al. |
| 8,542,455 B2 | 9/2013 | Huang et al. |
| 8,553,351 B1 | 10/2013 | Narayana et al. |
| 8,564,899 B2 | 10/2013 | Lou et al. |
| 8,576,506 B1 | 11/2013 | Wang et al. |
| 8,605,382 B1 | 12/2013 | Mallary et al. |
| 8,605,384 B1 | 12/2013 | Liu et al. |
| 8,610,391 B1 | 12/2013 | Yang et al. |
| 8,611,040 B1 | 12/2013 | Xi et al. |
| 8,619,385 B1 | 12/2013 | Guo et al. |
| 8,630,054 B2 | 1/2014 | Bennett et al. |
| 8,630,059 B1 | 1/2014 | Chen et al. |
| 8,634,154 B1 | 1/2014 | Rigney et al. |
| 8,634,283 B1 | 1/2014 | Rigney et al. |
| 8,643,976 B1 | 2/2014 | Wang et al. |
| 8,649,121 B1 | 2/2014 | Smith et al. |
| 8,654,466 B1 | 2/2014 | McFadyen |
| 8,654,467 B1 | 2/2014 | Wong et al. |
| 8,665,546 B1 | 3/2014 | Zhao et al. |
| 8,665,551 B1 | 3/2014 | Rigney et al. |
| 8,670,206 B1 | 3/2014 | Liang et al. |
| 8,687,312 B1 | 4/2014 | Liang |
| 8,693,123 B1 | 4/2014 | Guo et al. |
| 8,693,134 B1 | 4/2014 | Xi et al. |
| 2006/0215307 A1 * | 9/2006 | Yoshida et al. .................. 360/75 |
| 2009/0290252 A1 * | 11/2009 | Fukase ....................... 360/77.07 |
| 2010/0035085 A1 | 2/2010 | Jung et al. |
| 2012/0284493 A1 | 11/2012 | Lou et al. |
| 2013/0120870 A1 | 5/2013 | Zhou et al. |
| 2013/0148240 A1 | 6/2013 | Ferris et al. |

* cited by examiner

| D_WEDGE[-2] | SS[-2] | D_WEDGE[-1] | SS[-1] | D_WEDGE[0] | SS[0] | D_WEDGE[+1] | SS[+1] |

| D_WEDGE[0] | D_WEDGE[+1] | D_WEDGE[+2] | D_WEDGE[+3] |

BUFFER

UNSAFE → ABORT/RETRY

FIG. 7B

| D_WEDGE[-2] | SS[-2] | D_WEDGE[-1] | SS[-1] | D_WEDGE[0] | SS[0] | D_WEDGE[+1] | SS[+1] |

| D_WEDGE[0] | D_WEDGE[+1] | D_WEDGE[+2] | D_WEDGE[+3] |

BUFFER

SAFE, UNSAFE → DON'T RELEASE

FIG. 7C

| D_WEDGE[-2] | SS[-2] | D_WEDGE[-1] | SS[-1] | D_WEDGE[0] | SS[0] | D_WEDGE[+1] | SS[+1] |

| D_WEDGE[0] | D_WEDGE[+1] | D_WEDGE[+2] | D_WEDGE[+3] |

BUFFER

SAFE, SAFE → RELEASE

DISK DRIVE RELEASING VARIABLE AMOUNT OF BUFFERED WRITE DATA BASED ON SLIDING WINDOW OF PREDICTED SERVO QUALITY

CROSS-REFERENCE TO RELATED APPLICATIONS

This application claims priority to provisional U.S. Patent Application Ser. No. 61/822,485, filed on May 13, 2013, which is hereby incorporated by reference in its entirety.

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a VCM servo controller to control the actuator arm as it seeks from track to track.

Figure 1:
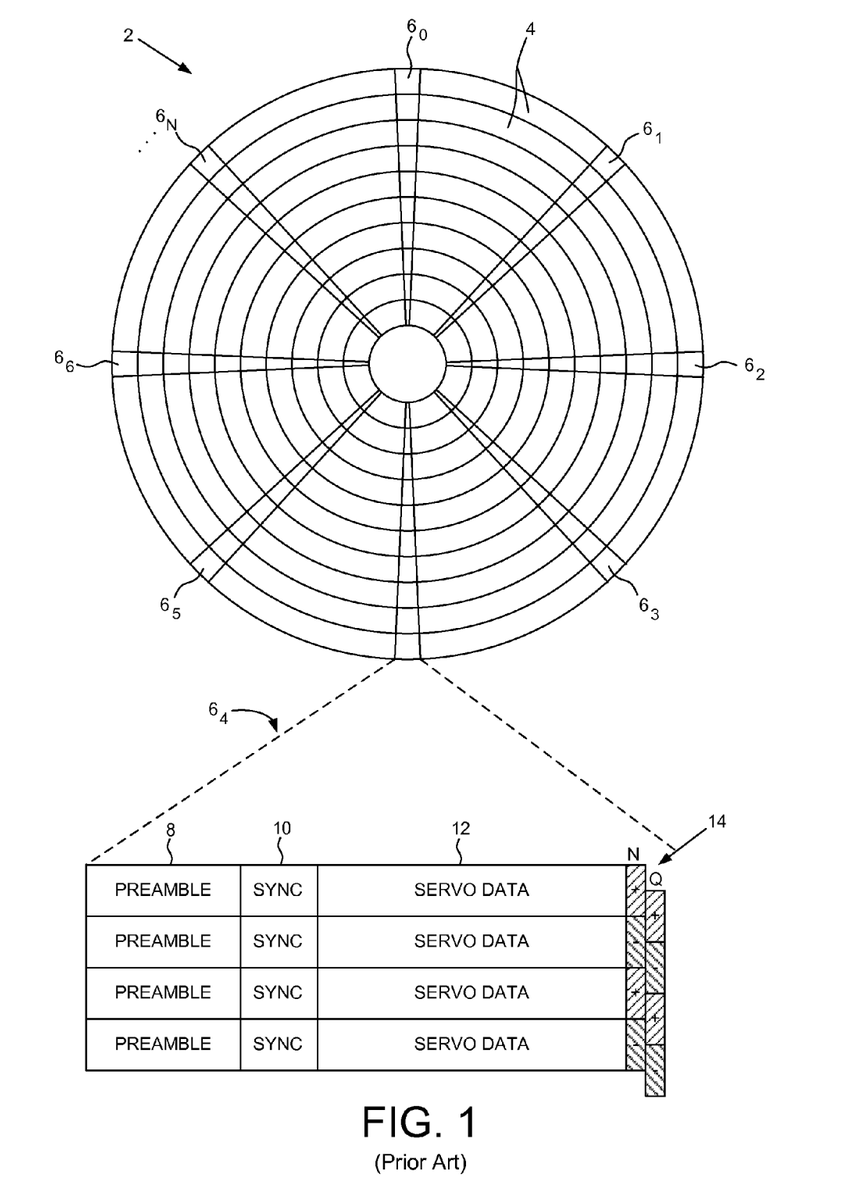
FIG. 1 shows a prior art disk format comprising a plurality of servo tracks defined by servo sectors.

FIG. 1 shows a prior art disk format 2 as comprising a number of servo tracks 4 defined by servo sectors $6_0$-$6_N$ recorded around the circumference of each servo track. Each servo sector 6, comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector 6, further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

An air bearing forms between the head and the disk due to the disk rotating at high speeds. Since the quality of the write/read signal depends on the fly height of the head, conventional heads (e.g., a magnetoresistive heads) may comprise an actuator for controlling the fly height. Any suitable fly height actuator may be employed, such as a heater which controls fly height through thermal expansion, or a piezoelectric (PZT) actuator. A dynamic fly height (DFH) servo controller may measure the fly height of the head and adjust the fly height actuator to maintain a target fly height during write/read operations.

Certain conditions may affect the ability of the VCM servo controller to maintain the head along the centerline of a target data track and/or the ability of the DFH servo controller to maintain the target fly height. For example, an external vibration applied to the disk drive or degradation and/or malfunction of the spindle motor that rotates the disks may induce a disturbance in the servo systems that cannot be adequately compensated. This is of particular concern during write operations when an off-track write may erase data in adjacent tracks, or an excessive fly height may render the written data unrecoverable due to under-saturation of the magnetic media. Accordingly, a disk drive will typically abort a write operation when the position error signal of the VCM servo controller or the fly height measurement of the DFH servo controller exceeds a write unsafe limit.

DETAILED DESCRIPTION

Figures 2A, 2B, 2C:
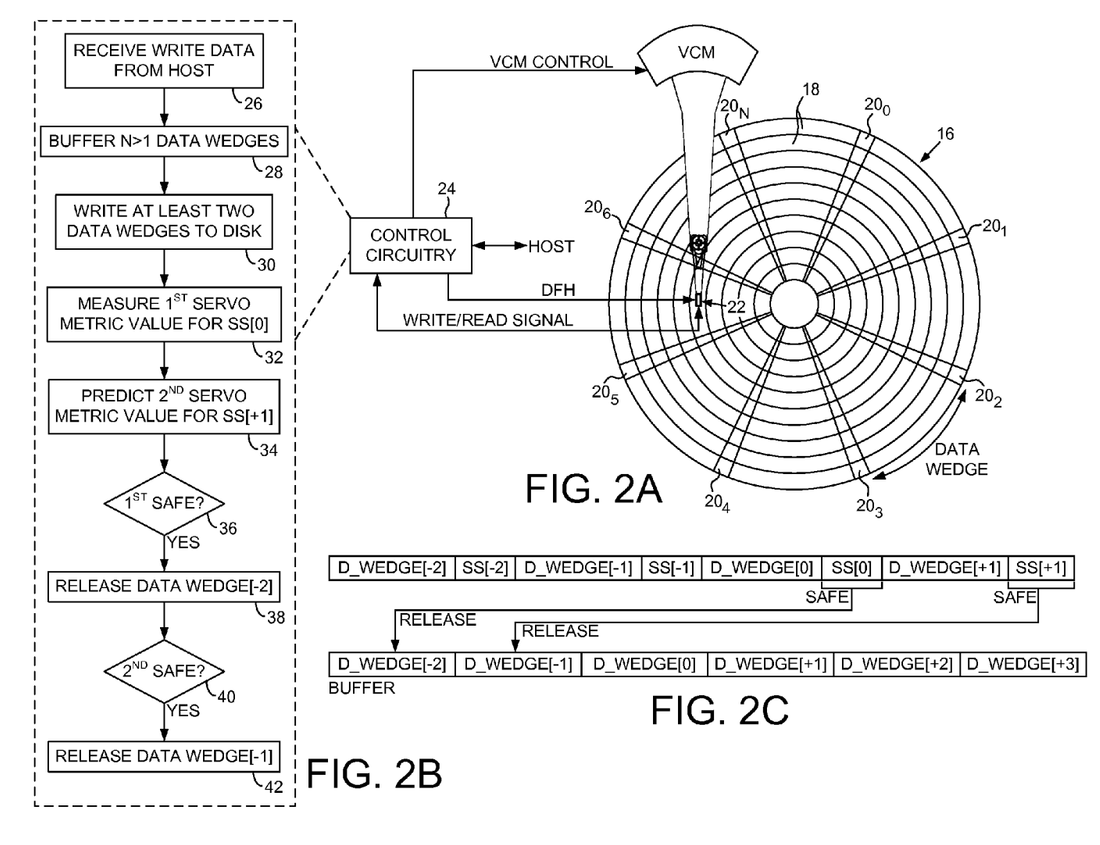
FIG. 2A shows a disk drive according to an embodiment comprising a head actuated over a disk.
FIG. 2B is a flow diagram according to an embodiment where data wedges that are buffered during a write operation are released based on a sliding window of predicted servo quality.
FIG. 2C illustrates an embodiment where a variable amount of data wedges are released during a write operation based on a servo metric measured for a current servo sector and a servo metric measured for a next servo sector.

FIG. 2A shows a disk drive comprising a disk 16 comprising a plurality of servo tracks 18 defined by servo sectors $20_0$-$20_N$, wherein data tracks are defined relative to the servo tracks 18 and the servo sectors $20_0$-$20_N$ define data wedges in the data tracks (e.g., data wedge between servo sectors $20_2$ and $20_3$). The disk drive further comprises a head 22 actuated over the disk 16, and control circuitry 24 operable to execute the flow diagram of FIG. 2B, wherein write data is received from a host in connection with executing a write operation (block 26). N data wedges of the write data are buffered in a buffer (block 28), where N is greater than one. After writing at least two of the data wedges to the disk including a first data wedge and a second data wedge (block 30), a first servo metric value is measured when reading a first servo sector (block 32), and a second servo metric value is predicted based at least partly on the first servo metric value (block 34), wherein the second servo metric value corresponds to a second servo sector following the first servo sector. When the first servo metric value indicates a safe write condition and the second servo metric value indicates an unsafe write condition (block 36), the first data wedge is released from the buffer (block 38), and when the first servo metric value indicates a safe write condition and the second servo metric value indicates a safe write condition (block 40), the first and second data wedges are released from the buffer (block 42).

FIG. 2C shows an example buffer storing write data received from a host, wherein the control circuitry 24 maintains a number of data wedges of the write data in the buffer in the event that the current write operation is aborted due, for example, to an excessive PES or an excessive fly height. When a write operation is aborted while writing a current data wedge, it is assumed that a number of data wedges preceding the current data wedge may also be unreliable and should also be rewritten during a retry operation. If the write operation is not aborted when writing the current data wedge, a previously written data wedge is presumed reliable and therefore the corresponding memory segment in the buffer is released and the host notified that the corresponding data has been written to the disk. This delay in releasing the write data from the buffer and notifying the host of the completion of the write operation for the write data can reduce the performance of the disk drive as seen from the host when, for example, the delay results in slipped revolutions of the disk during sequential write operations.

Referring to the example of FIG. 2C, the delay in releasing data wedges from the buffer and notifying the host may be three data wedges long. After processing a current servo sector SS[0], the corresponding servo metric value is evaluated to determine whether to abort the write operation. If the servo metric value indicates a safe write condition, then the data wedge D_WEDGE[−2] written two wedges before the current data wedge D_WEDGE[0] is released from the buffer. When evaluating only the servo metric value of the current servo sector, the latency in releasing the data wedges remains fixed (e.g., at three data wedges in the example of FIG. 2C) which can degrade performance of the disk drive.

Accordingly, in one embodiment the latency in releasing the data wedges may be reduced based on a predicted servo metric value for one or more future servo sectors. This is illustrated in the example of FIG. 2C wherein a second servo metric value is predicted for the next servo sector SS[+1]. When the first and second servo metric values indicate a safe write condition, the control circuitry releases two data wedges from the buffer (D_WEDGE[−2] and D_WEDGE[−1]) thereby reducing the latency of releasing the data wedges by a full data wedge. When the first servo metric value indicates a safe write condition, but the second servo metric value indicates an unsafe write condition, then only data wedge D_WEDGE[−2] is released and the write operation continues. Accordingly, the latency of releasing data wedges may vary depending on the servo metric value predicted for the future servo sectors.

Any suitable technique may be employed to predict the servo metric value for a future servo sector. For example, in one embodiment the servo metric value for the next servo sector may be generated according to:

$$SM[k+1]=2\cdot SM[k]-SM[k-1]$$

where SM[k+1] represents the servo metric value predicted for the next servo sector, SM[k] represents the servo metric value measured for the current servo sector, and SM[k−1] represents the servo metric value measured for the previous servo sector. In another embodiment, a state estimator may process the current and previously measured servo metric values in order to predict a servo metric value for a future servo sector.

Figure 3:
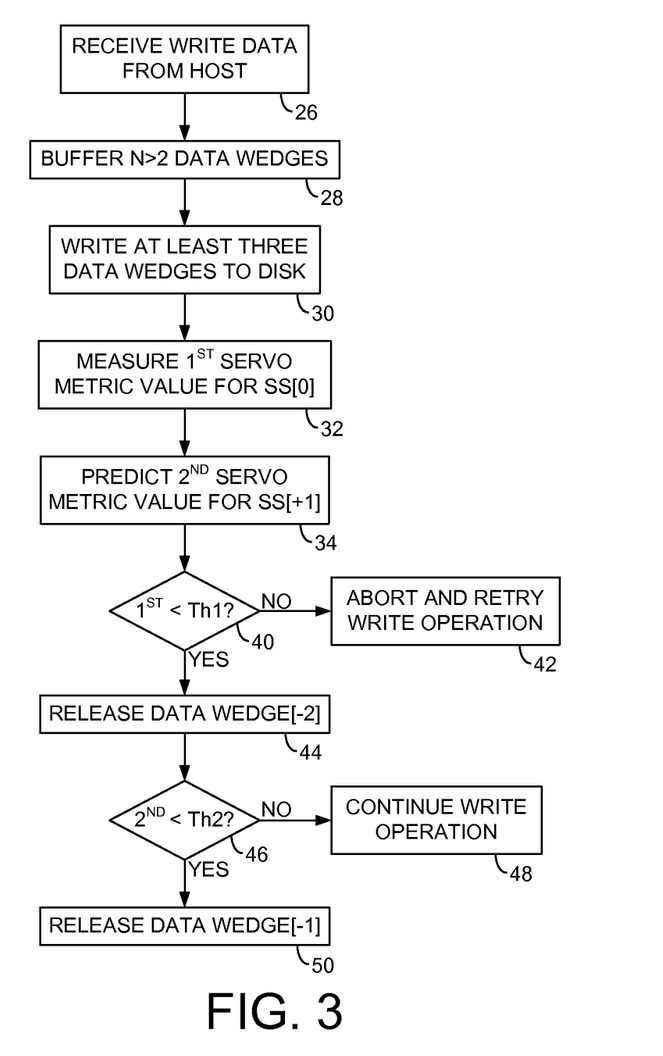
FIG. 3 is a flow diagram according to an embodiment wherein one or two data wedges are released based on a servo metric measured for a current servo sector and a servo metric measured for a next servo sector.
Figure 4A:
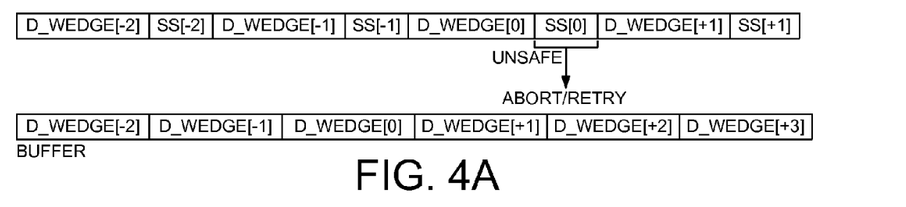
FIGS. 4A-4C illustrate an embodiment where a write operation may be aborted, a single data wedge released, or two data wedges released based on a servo metric measured for a current servo sector and a servo metric measured for a next servo sector.
Figure 4B:
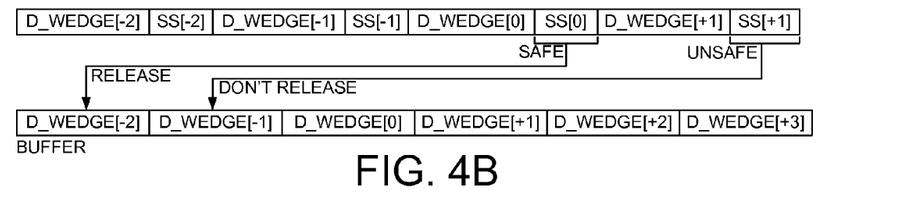
Figure 4C:
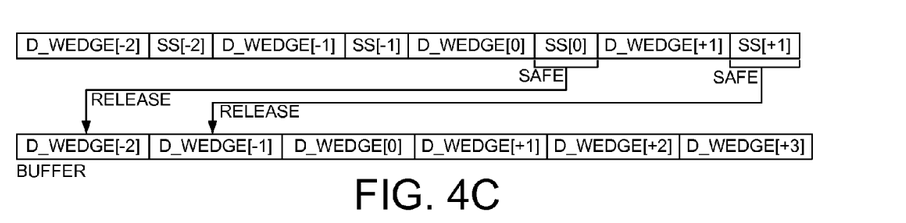

In one embodiment, the tolerance for detecting a safe write condition based on the servo metric value predicted for a future servo sector may be tightened to help ensure the reliability of the written data before being released. This embodiment is understood with reference to the flow diagram of FIG. 3 which extends on the flow diagram of FIG. 2B, wherein the first servo metric value measured for the current servo sector is compared to a first threshold Th1 (block 40). If the first servo metric value exceeds the first threshold Th1 indicating an unsafe write condition, then the write operation is aborted and retried (block 42) as illustrated in FIG. 4A. When the first servo metric value does not exceed the first threshold indicating a safe write condition, then the data wedge D_WEDGE[−2] is released from the buffer (block 44). When the second servo metric value predicted for the next servo sector exceeds a second threshold Th2 lower than the first threshold Th1 indicating an unsafe write condition, the write operation is continued without releasing more data wedges (block 48) as illustrated in FIG. 4B. When the second metric value predicted for the next servo sector does not exceed the second, lower threshold Th2 indicating a safe write condition, an additional data wedge D_WEDGE[−1] is released (block 50) thereby reducing the latency as seen from the host as illustrated in FIG. 4C. Because the second threshold Th2 is lower than the first threshold Th1, the prediction of a safe write condition becomes more reliable so that the additional data wedge may be released with a higher degree of confidence.

Figure 5A:
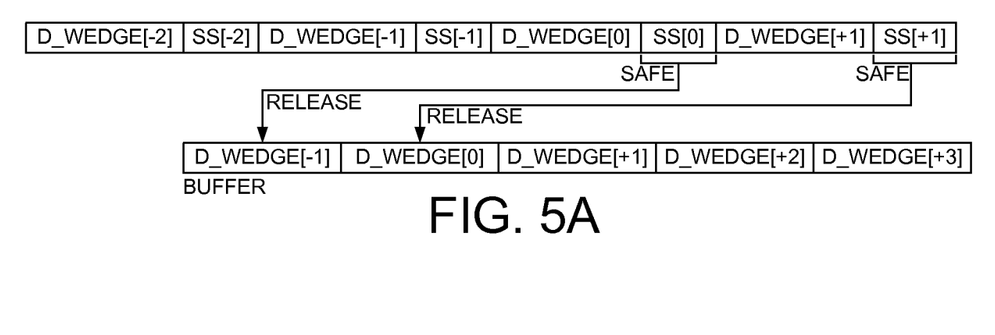
FIG. 5A illustrates an embodiment wherein two data wedges may be buffered during a write operation.

Any suitable length latency window may be employed to delay the release of the data wedges from the buffer, wherein the longer the latency window, the higher the likelihood that the data was written reliably when released. FIG. 5A shows an embodiment wherein the latency window is reduced from three data wedges as shown in FIG. 2C to two data wedges, including the most recently written data wedge D_WEDGE[0] and the previously written data wedge D_WEDGE[−1]. This embodiment is essentially the same as shown in FIG. 2C except that the length of the latency window may vary between two and one data wedges depending on the servo metric value predicted for the next servo sector.

Figure 5B:
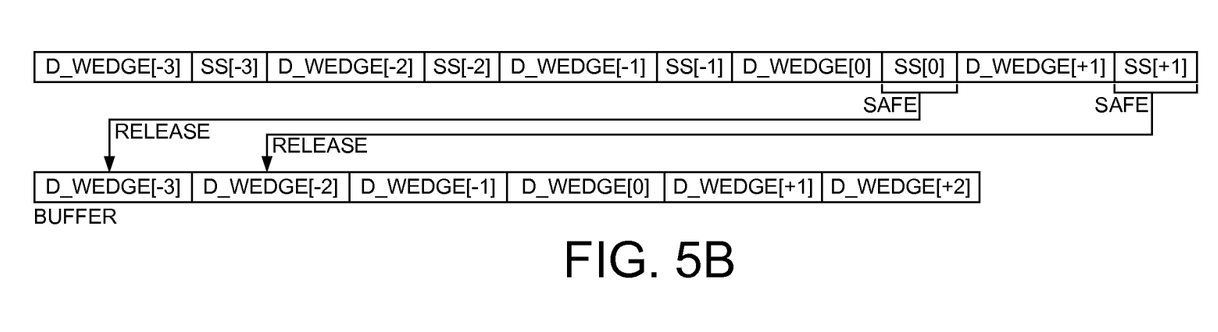
FIG. 5B illustrates an embodiment wherein more than three data wedges may be buffered during a write operation.

FIG. 5B shows an embodiment wherein the latency window is increased from three data wedges as shown in FIG. 2C to four data wedges. When the first servo metric value measured for the current servo sector indicates a safe write condition, the data wedge D_WEDGE[−3] is released, and when the second servo metric value predicted for the next servo sector indicates a safe write condition, the data wedge D_WEDGE[−2] is released. Accordingly, in this embodiment the length of the latency window may vary between four and three data wedges depending on the servo metric value predicted for the next servo sector.

Figure 6A:
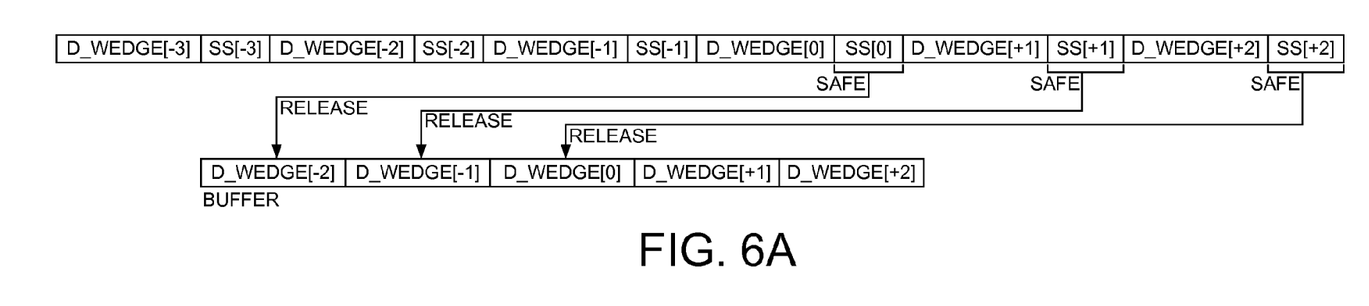
FIGS. 6A and 6B illustrate an embodiment where up to three data wedges may be released during a write operation based on a servo metric measured for a current servo sector and two future servo sectors.
Figure 6B:
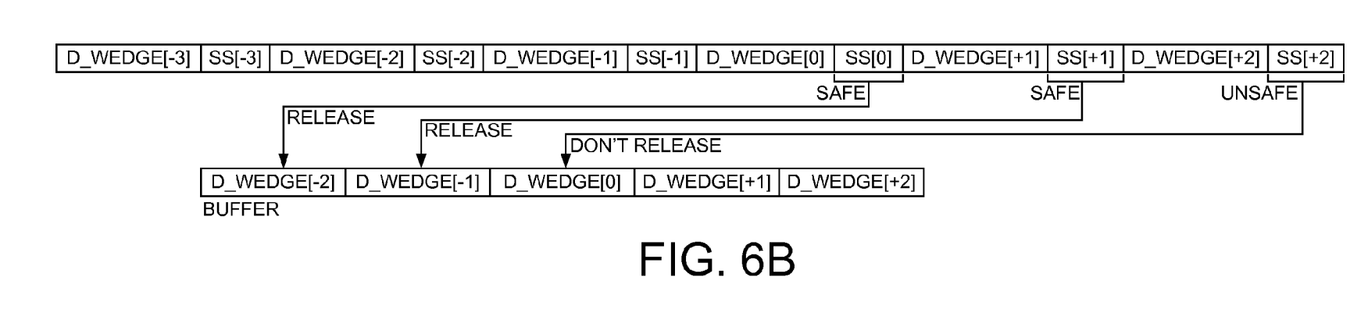

A servo metric value may be predicted for more than just the next servo sector, and the additional servo metric values used to adjust the length of the latency window. FIG. 6A illustrates an embodiment wherein a servo metric value is predicted for the next two servo sectors SS[+1] and SS[+2]. In this embodiment, the length of the latency window may vary between four and two data wedges. For example, if the servo metric value for servo sectors SS[0], SS[+1], and SS[+2] all indicate a safe write condition, then the control circuitry may release three data wedges from the buffer which reduces the latency window to two data wedges as shown in FIG. 6A. If only the first two servo metric values for servo sectors SS[0] and SS[+1] indicate a safe write condition, then the control circuitry releases two data wedges from the buffer which reduces the latency window to three data wedges as shown in FIG. 6B. The embodiment shown in FIGS. 6A and 6B may employ a longer latency window, such as five data wedges, wherein the length of the latency window would vary between five and three data wedges. The embodiment shown in FIGS. 6A and 6B may be extended to evaluate the servo metric value predicted for additional future servo sectors so that the length of the latency window would vary over a greater number of data wedges.

Figure 7A:
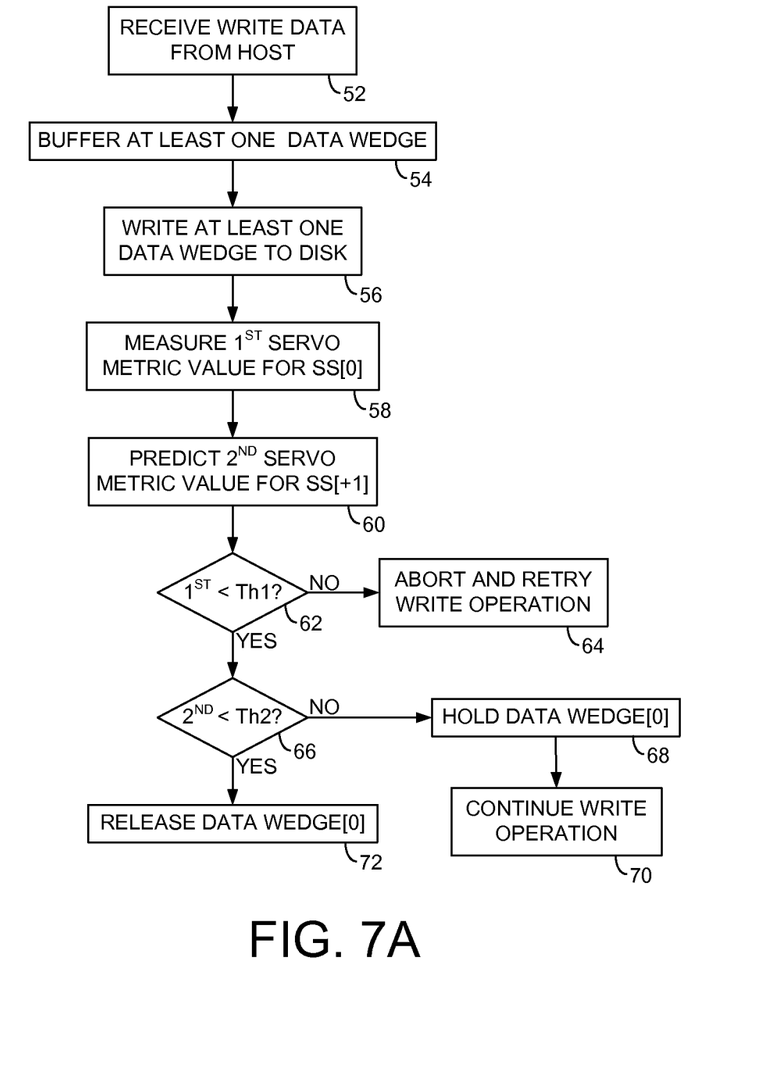
FIGS. 7A-7D illustrate an embodiment wherein a single data wedge may be held in the buffer or released from the buffer based on a servo metric measured for a current and next servo sector.
Figure 7B:
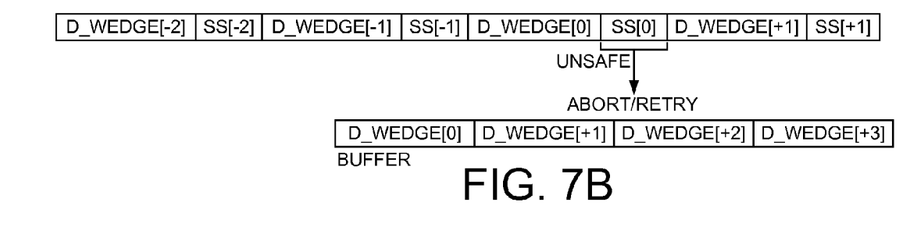
Figure 7C:
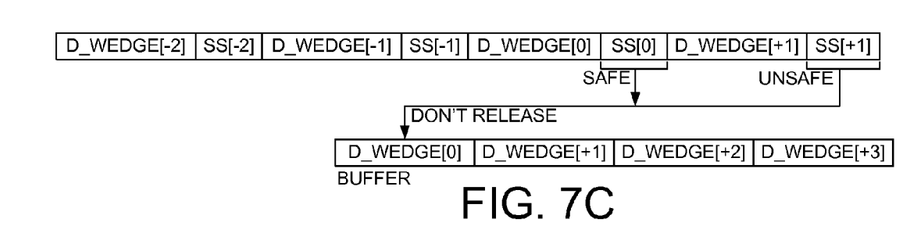
Figure 7D:
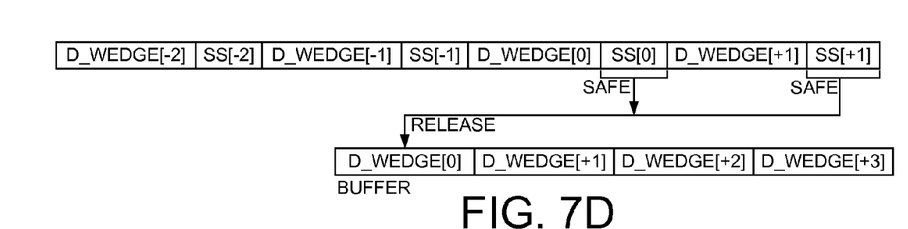

The above described embodiments can also reduce the latency in releasing data wedges from the buffer by releasing a single data wedge (at the front of the latency window) when the servo metric value for both the current and next servo sector indicate a safe write condition. This embodiment is understood with reference to the flow diagram of FIG. 7A wherein when write data is received from the host in connection with executing a write operation (block 52), a first data wedge of the write data is buffered in a buffer (block 54). After writing the first data wedge to the disk (block 56), a first servo metric value is measured when reading a first servo sector (block 58), and a second servo metric value is predicted based at least partly on the first servo metric value (block 60), wherein the second servo metric value corresponds to a second servo sector following the first servo sector. When the first servo metric value indicates an unsafe write condition (block 62), the write operation is aborted (block 64) and retried as illustrated in FIG. 7B. When the first servo metric value indicates a safe write condition (block 62), and the second servo metric value indicates an unsafe write condition (block 66), the first data wedge is held in the buffer (block 68) and the write operation continues (block 70) as illustrated in FIG. 7C. When the first and second servo metric values indicate a safe write condition, the first data wedge is released from the buffer (block 72) as illustrated in FIG. 7D. Similar to the embodiment described above with reference to FIG. 6B, the flow diagram of FIG. 7A may be modified to hold or release a single data wedge based on a servo metric value predicted for more than a single servo sector following the current servo sector.

In one embodiment, the average length of the latency window while processing a write operation will be shorter as compared to the prior art technique that employs a fixed latency window. For example, varying the length of the latency window between three and two data wedges such that the average length of the latency window is, for example, 2.25 data wedges may provide an increase in performance from the host perspective as compared to employing a fixed length latency window of three data wedges.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein.

What is claimed is:

1. A disk drive comprising:
   a disk comprising a plurality of servo tracks defined by servo sectors, wherein data tracks are defined relative to the servo tracks and the servo sectors define data wedges in the data tracks;
   a head actuated over the disk; and
   control circuitry operable to:
      receive write data from a host in connection with executing a write operation;
      buffer N data wedges of the write data in a buffer, where N is greater than one;
      after writing at least two of the data wedges to the disk including a first data wedge and a second data wedge, measure a first servo metric value when reading a first servo sector;
      predict a second servo metric value based at least partly on the first servo metric value, wherein the second servo metric value corresponds to a second servo sector following the first servo sector;
      when the first servo metric value indicates a safe write condition and the second servo metric value indicates an unsafe write condition, release the first data wedge from the buffer; and
      when the first servo metric value indicates a safe write condition and the second servo metric value indicates a safe write condition, release the first and second data wedges from the buffer.

2. The disk drive as recited in claim 1, wherein the second data wedge is written to the disk after the first data wedge.

3. The disk drive as recited in claim 1, wherein when the first servo metric value indicates an unsafe write condition the control circuitry is operable to retry the write operation.

4. The disk drive as recited in claim 1, wherein the servo metric comprises a position error signal (PES) representing a difference between a measured position of the head and a target position.

5. The disk drive as recited in claim 1, wherein the servo metric comprises a fly height error representing a difference between a measured fly height of the head and a target fly height.

6. The disk drive as recited in claim 1, wherein:
the first servo metric value indicates a safe write condition when the first servo metric value is less than a first threshold; and
the second servo metric value indicates a safe write condition when the second servo metric value is less than a second threshold, where the second threshold is less than the first threshold.

7. The disk drive as recited in claim 1, wherein N is greater than three and the control circuitry is further operable to:
predict a third servo metric value based on the first servo metric value and the second servo metric value, wherein the third servo metric value corresponds to a third servo sector following the first servo sector;
when the first servo metric value indicates a safe write condition and the second servo metric value indicates a safe write condition and the third servo metric value indicates an unsafe write condition, release the first and second data wedges from the buffer; and
when the first servo metric value indicates a safe write condition and the second servo metric value indicates a safe write condition and the third servo metric value indicates a safe write condition, release the first, second and third data wedges from the buffer.

8. A method of operating a disk drive comprising a head actuated over a disk comprising a plurality of servo tracks defined by servo sectors, wherein data tracks are defined relative to the servo tracks and the servo sectors define data wedges in the data tracks, the method comprising:
receiving write data from a host in connection with executing a write operation;
buffering N data wedges of the write data in a buffer, where N is greater than one;
after writing at least two of the data wedges to the disk including a first data wedge and a second data wedge, measuring a first servo metric value when reading a first servo sector;
predicting a second servo metric value based at least partly on the first servo metric value, wherein the second servo metric value corresponds to a second servo sector following the first servo sector;
when the first servo metric value indicates a safe write condition and the second servo metric value indicates an unsafe write condition, releasing the first data wedge from the buffer; and
when the first servo metric value indicates a safe write condition and the second servo metric value indicates a safe write condition, releasing the first and second data wedges from the buffer.

9. The method as recited in claim 8, wherein the second data wedge is written to the disk after the first data wedge.

10. The method as recited in claim 8, wherein when the first servo metric value indicates an unsafe write condition the method further comprises retrying the write operation.

11. The method as recited in claim 8, wherein the servo metric comprises a position error signal (PES) representing a difference between a measured position of the head and a target position.

12. The method as recited in claim 8, wherein the servo metric comprises a fly height error representing a difference between a measured fly height of the head and a target fly height.

13. The method as recited in claim 8, wherein:
the first servo metric value indicates a safe write condition when the first servo metric value is less than a first threshold; and
the second servo metric value indicates a safe write condition when the second servo metric value is less than a second threshold, where the second threshold is less than the first threshold.

14. The method as recited in claim 8, wherein N is greater than three and the method further comprises:
predicting a third servo metric value based on the first servo metric value and the second servo metric value, wherein the third servo metric value corresponds to a third servo sector following the first servo sector;
when the first servo metric value indicates a safe write condition and the second servo metric value indicates a safe write condition and the third servo metric value indicates an unsafe write condition, releasing the first and second data wedges from the buffer; and
when the first servo metric value indicates a safe write condition and the second servo metric value indicates a safe write condition and the third servo metric value indicates a safe write condition, releasing the first, second and third data wedges from the buffer.

15. A disk drive comprising:
a disk comprising a plurality of servo tracks defined by servo sectors, wherein data tracks are defined relative to the servo tracks and the servo sectors define data wedges in the data tracks;
a head actuated over the disk; and
control circuitry operable to:
receive write data from a host in connection with executing a write operation;
buffer a first data wedge of the write data in a buffer;
after writing the first data wedge to the disk, measure a first servo metric value when reading a first servo sector;
predict a second servo metric value based at least partly on the first servo metric value, wherein the second servo metric value corresponds to a second servo sector following the first servo sector;
when the first servo metric value indicates a safe write condition and the second servo metric value indicates an unsafe write condition, hold the first data wedge in the buffer; and
when the first servo metric value indicates a safe write condition and the second servo metric value indicates a safe write condition, release the first data wedge from the buffer,
wherein the first servo metric value indicates a safe write condition when the first servo metric value is less than a first threshold; and
the second servo metric value indicates a safe write condition when the second servo metric value is less than a second threshold, where the second threshold is less than the first threshold.

16. The disk drive as recited in claim 15, wherein when the first servo metric value indicates an unsafe write condition the control circuitry is operable to retry the write operation.

17. The disk drive as recited in claim 15, wherein the servo metric comprises a position error signal (PES) representing a difference between a measured position of the head and a target position.

18. The disk drive as recited in claim 15, wherein the servo metric comprises a fly height error representing a difference between a measured fly height of the head and a target fly height.

19. The disk drive as recited in claim 15, wherein the control circuitry is further operable to:
predict a third servo metric value based on the first servo metric value and the second servo metric value, wherein the third servo metric value corresponds to a third servo sector following the first servo sector;
when the first servo metric value indicates a safe write condition and the second servo metric value indicates a safe write condition and the third servo metric value indicates an unsafe write condition, hold the first data wedge in the buffer; and
when the first servo metric value indicates a safe write condition and the second servo metric value indicates a safe write condition and the third servo metric value indicates a safe write condition, release the first data wedge from the buffer.

20. A method of operating a disk drive comprising a head actuated over a disk comprising a plurality of servo tracks defined by servo sectors, wherein data tracks are defined relative to the servo tracks and the servo sectors define data wedges in the data tracks, the method comprising:
receiving write data from a host in connection with executing a write operation;
buffering a first data wedge of the write data in a buffer;
after writing the first data wedge to the disk, measuring a first servo metric value when reading a first servo sector;
predicting a second servo metric value based at least partly on the first servo metric value, wherein the second servo metric value corresponds to a second servo sector following the first servo sector;
when the first servo metric value indicates a safe write condition and the second servo metric value indicates an unsafe write condition, holding the first data wedge in the buffer; and
when the first servo metric value indicates a safe write condition and the second servo metric value indicates a safe write condition, releasing the first data wedge from the buffer,
wherein the first servo metric value indicates a safe write condition when the first servo metric value is less than a first threshold; and
the second servo metric value indicates a safe write condition when the second servo metric value is less than a second threshold, where the second threshold is less than the first threshold.

21. The method as recited in claim 20, wherein when the first servo metric value indicates an unsafe write condition the method further comprises retrying the write operation.

22. The method as recited in claim 20, wherein the servo metric comprises a position error signal (PES) representing a difference between a measured position of the head and a target position.

23. The method as recited in claim 20, wherein the servo metric comprises a fly height error representing a difference between a measured fly height of the head and a target fly height.

24. The method as recited in claim 20, further comprising:
predicting a third servo metric value based on the first servo metric value and the second servo metric value, wherein the third servo metric value corresponds to a third servo sector following the first servo sector;
when the first servo metric value indicates a safe write condition and the second servo metric value indicates a safe write condition and the third servo metric value indicates an unsafe write condition, holding the first data wedge in the buffer; and
when the first servo metric value indicates a safe write condition and the second servo metric value indicates a safe write condition and the third servo metric value indicates a safe write condition, releasing the first data wedge from the buffer.

* * * * *